Figure 1:
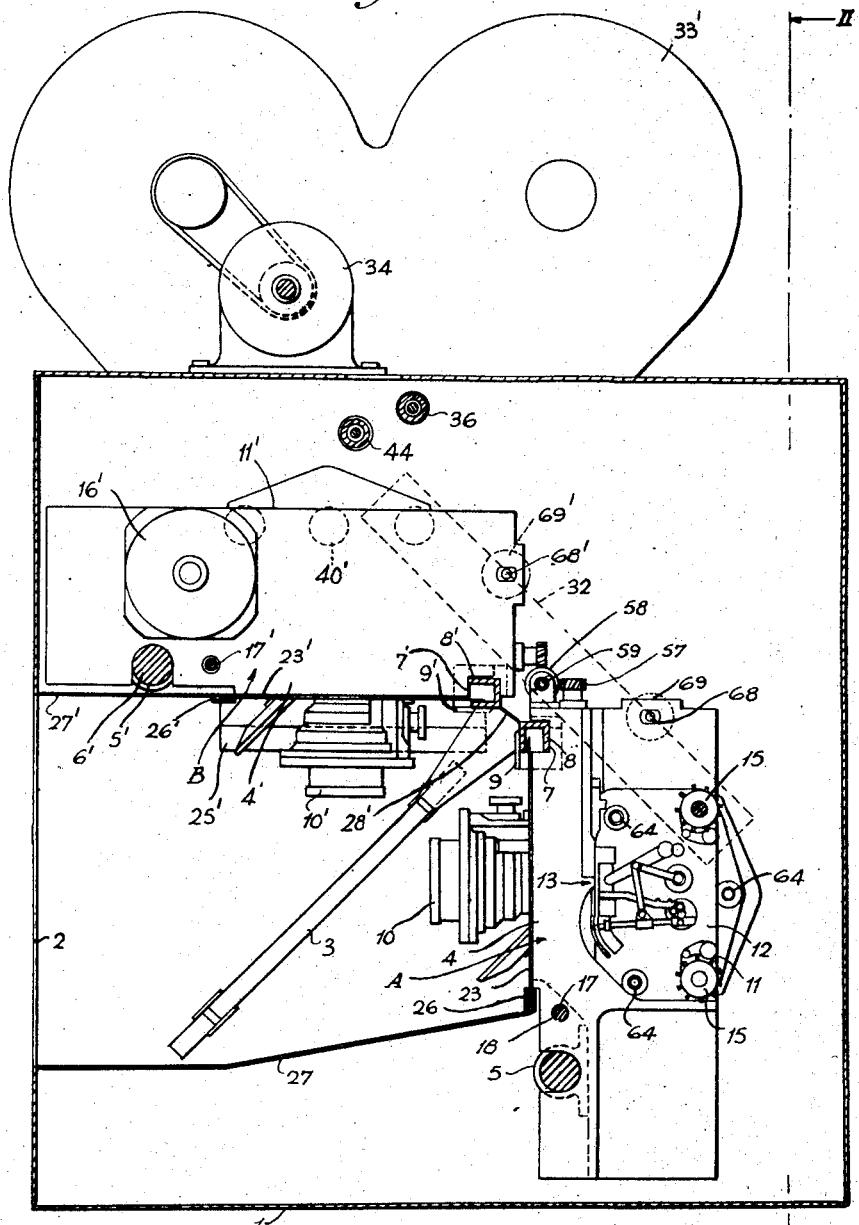

June 23, 1959     N. L. SPOTTISWOODE ET AL     2,891,441
STEREOSCOPIC CAMERAS
Filed Aug. 10, 1954     4 Sheets-Sheet 1

Inventors
NIGEL L. SPOTTISWOODE
RAYMOND J. SPOTTISWOODE
By
Holcombe, Wetherill & Brisbois
Attorneys

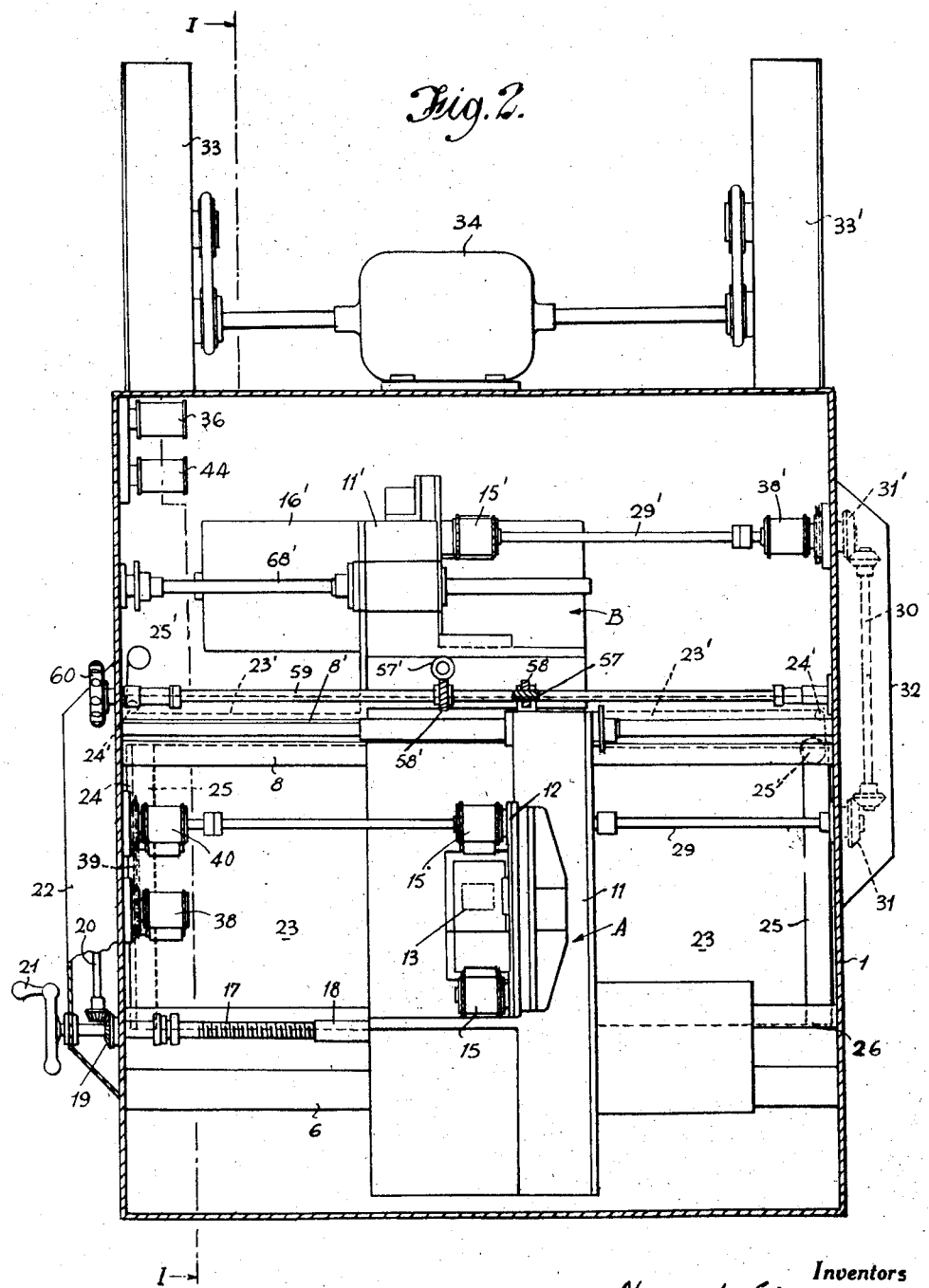

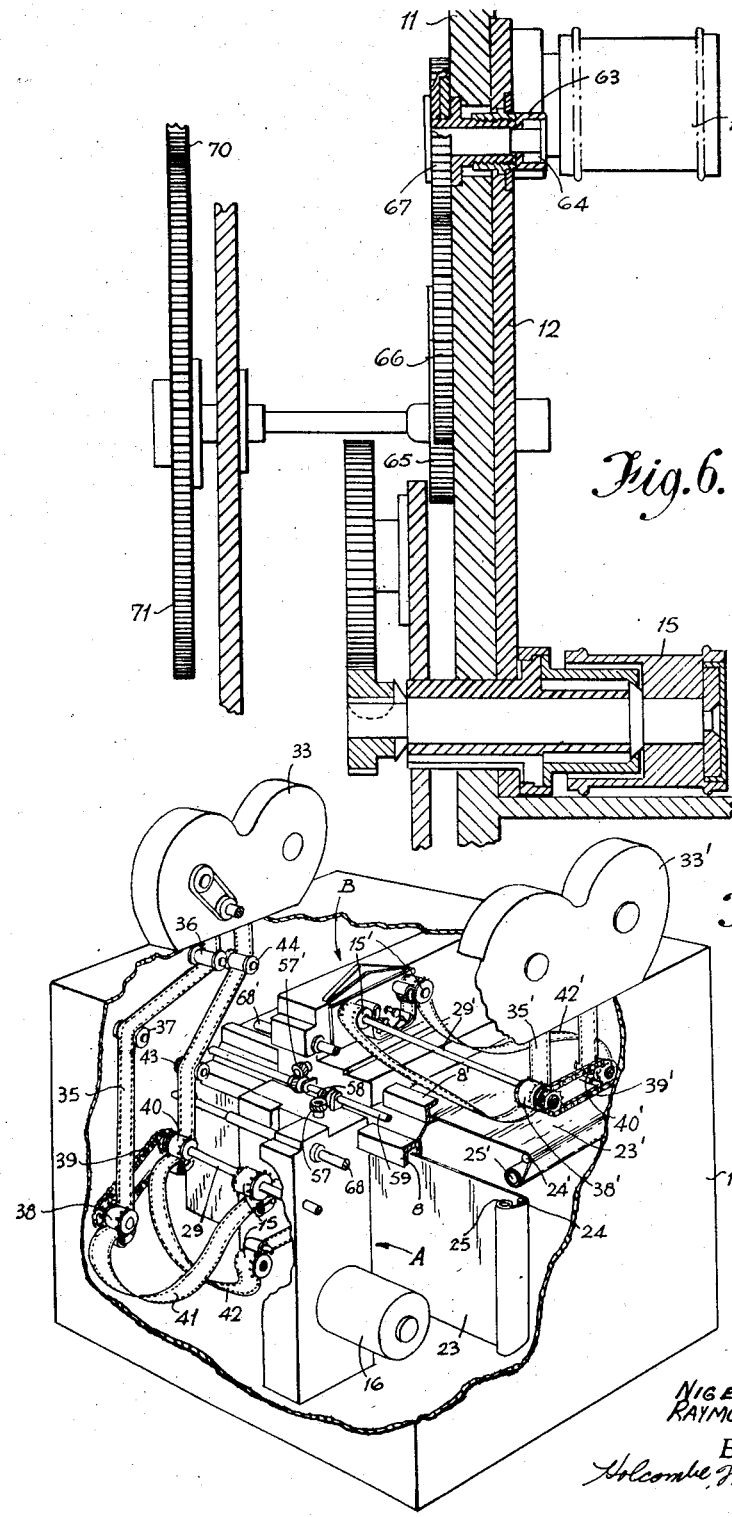

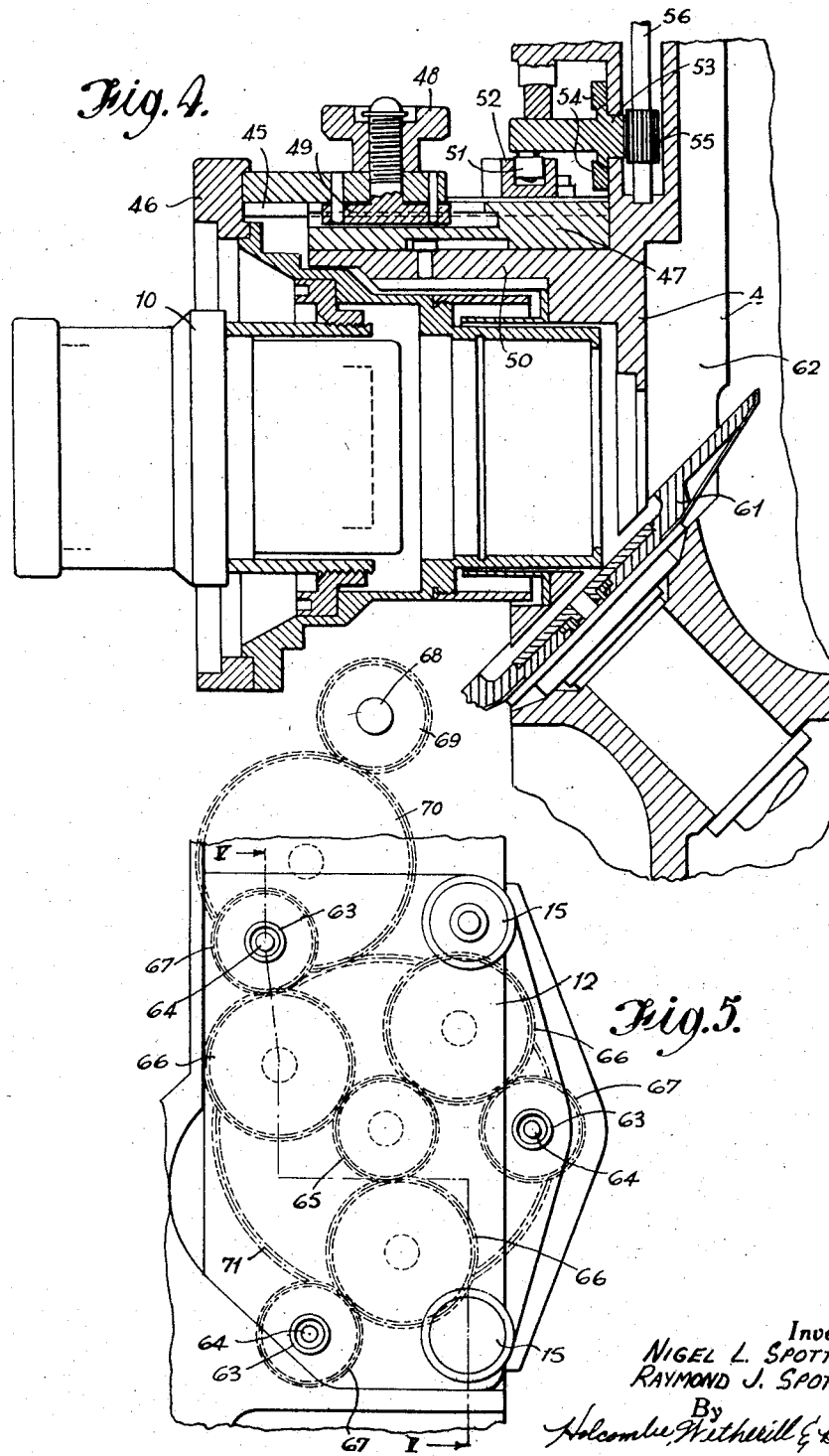

United States Patent Office 2,891,441
Patented June 23, 1959

2,891,441

STEREOSCOPIC CAMERAS

Nigel Lawrence Spottiswoode and Raymond John Spottiswoode, London, England, assignors to National Research Development Corporation, London, England, a British corporation Application August 10, 1954, Serial No. 448,893

Claims priority, application Great Britain August 11, 1953

8 Claims. (Cl. 88—16.6)

The present invention relates to stereoscopic cameras for the production of three-dimensional motion picture films.

Stereoscopic motion picture films have hitherto been produced by using two separate motion picture cameras which have been assembled together on an appropriate framework in a manner to enable the cameras to be operated to photograph the scene simultaneously from different viewpoints. The present invention has for its object to provide a stereoscopic motion picture camera which contains both camera units in a single box-like container which also carries or contains compartments for the film spools, and in which the camera units are adjustable so as to vary the inter-axial distance between the camera objectives for recording the right and left images while the said compartments remain in their fixed position in said container.

The invention consists in a stereoscopic motion picture camera, comprising a box-like casing having an aperture in its front wall, a semi-reflecting mirror arranged within the casing behind said aperture and inclined at approximately 45° to the horizontal plane, two motion picture camera units each comprising an objective and a film feed mechanism, means for driving the film feed mechanisms of the two camera units at the same speed, the first camera unit having its objective arranged behind said mirror with the axis of its objective extending horizontally, and the second camera unit being arranged with the axis of its objective extending vertically to receive light reflected from the front surface of said mirror, at least one of said camera units being mounted on guides for movement transversely within the camera casing, film supply and film take-up means for each camera unit mounted in fixed positions on the camera casing, means for feeding the film to and from the movable camera unit comprising two film sprockets and means for retaining the film in engagement therewith fixed inside the camera casing, means coupling said sprockets to the film feed mechanism of the movable camera unit so that said sprockets and said film feed mechanism advance the film at the same speed, the lengths of film between said sprockets and said film feed mechanism comprising slack loops which permit transverse movement of the movable camera unit, and light screening partitions extending between the camera units and the interior of the casing and preventing light which passes through said opening from reaching the films passing within the camera casing except through the objectives.

Preferably both camera units are movable on guides transversely within the camera casing, the films being fed to and from their respective camera units over pairs of film sprockets which are coupled to and driven at the same film speed as the film feed mechanisms of the camera units.

The camera units may be shifted transversely by means of lead screws which may be coupled together for simultaneous movement in opposite directions by the operation of a common actuating member.

According to a feature of the invention, the film gate and film-engaging members of the film feed mechanism are assembled as a sub-unit is mounted on a camera unit by adjustable mounting means which enable the sub-unit to be moved transversely with respect to the optical axis of the objective, in order to produce any desired degree of convergence or "toeing-in" of the two optical systems. The adjustable mounting means may comprise at least three micrometer screws which are coupled together by gearing for simultaneous operation.

In order that the invention may be more clearly understood, reference will now be made to the accompanying drawings, in which:

Figure 1 shows a side view, taken along the line I—I of Figure 2, of a stereoscopic camera according to this invention, Figure 2 shows a rear view looking along the line II—II in Figure 1, Figure 3 is a perspective view from the rear of the camera with part of the casing and some of the components cut away, Figure 4 is an enlarged side sectional view of the lens mounting arrangement and shutter, Figure 5 is a side view of the film feed mechanism sub-frame with the film-engaging parts of the film feed mechanism removed, Figure 6 is a section along the line V—V in Figure 5.

Referring to the drawings, the camera comprises a box-like casing 1 of rectangular form having an opening 2 in its front wall. Arranged within the casing behind the opening 2 is a semi-reflecting mirror 3 arranged at 45° to the horizontal plane so that light from the scene to be photographed which passes through the opening 2 and falls on to the mirror 3 will be partially reflected into the objective 10' of one camera unit B arranged above the mirror, and be partially transmitted through the mirror into the objective 10 of the camera unit A arranged behind the mirror. The two camera units A and B thus simultaneously view the same scene, the inter-axial separation between the two objectives 10 and 10' being effected by moving either or both camera units A and B transversely according to the principle described in the specification of our co-pending application Serial No. 431,934 filed May 24, 1954.

As the two camera units A and B are substantially identical and are mounted for transverse movement in the camera casing in like ways, the construction and mounting of only one unit will be described in detail, like or corresponding parts in the other unit being referenced with the same reference numerals with a prime. Describing therefore the construction and mounting of camera unit A, this unit comprises a main housing 4 which may be built up from metal castings to form compartments for accommodating the drive gearing and other components of the camera mechanism. The housing 4 carries adjacent its front and towards its lower end a bearing 5 slidable on a rod 6, fixed to and extending between the side walls of the casing 1, and its upper end is formed with a rectangular slot 7 which fits around the slides on a channel-shaped bar 8 also fixed to and extending between the side walls of the casing 1. The camera unit is retained on this channel-shaped bar by a plate 9 bolted to the front of the unit and extending in front of the bar 8. Carried from the front of the housing is the objective 10 and to the side face of the rearwardly extending compartment 11 is fitted a sub-unit comprising a plate 12 carrying the film gate 13, the film feed claw 14, and the film feed sprockets 15 constituting the film feeding mechanism of the camera unit. The housing 4 also carries an electric motor 16 for driving the film feeding mechanism through gearing arranged in the compartment 11.

With the construction described the camera unit can slide bodily, transversely of the casing 1, on the guides 6 and 8, so as to vary the inter-axial spacing between the objectives of the two units. Transverse movement of the camera unit A is effected by the lead screw 17 threaded into a sleeve 18 extending through the housing 4. The end of the screw 17 projects outside the casing 1 where it is fitted with a bevel gear 19, which is coupled by the shaft 20, provided with bevel gears at opposite ends, to the lead screw 17' of camera unit B. Rotation of the handle 21 at the end of lead screw 17 thus causes both lead screws 17 and 17' to turn simultaneously to shift the camera units A and B in opposite directions. The external drive 19—20 is enclosed by a cover 22.

In order to prevent stray light which passes through the opening 2 from fogging the film being fed through a camera unit, light screening partitions are arranged around the camera units, the partitions at each side of a camera unit being extensible to permit transverse movement of the unit. In the embodiment shown, to each side of the housing 4 is secured respectively one end of two strips 23 of opaque flexible material, the opposite ends of which respectively pass over rods 24 mounted adjacent the side walls of the casing 1 and are respectively secured to rollers 25 provided with springs which tend to keep the screen material wound up thereon in the manner of a roller blind. The upper edge of the screen 23 extends into the channel of the bar 8 and the lower edge extends into a channel 26 formed at the end of a partition member 27 extending across the full width of the camera casing. Thus, as the camera unit is moved transversely, the flexible screen 23 at one side thereof will be unwound from its associated roller 25, whilst tensioning the restoring spring of that roller, and screen on the opposite side will be wound up on its associated roller 25 by the action of its spring. The gap between the two bars 8, 8' is closed by a partition 28 extending therebetween.

Although the two camera units A and B are provided with separate driving motors 16, 16', their operation must be synchronised. To this end a splined shaft 29 extends through a bore in one of the feed sprockets 15 of the unit A. The shaft 29 is mounted in bearings in the camera casing 1 in alignment with the axis of the sprocket 15. The sprocket 15 is slidable longitudinally along the splines of the shaft 29 but rotates therewith, so that rotation of the sprocket 15 by the motor 16 will cause rotation of the shaft 29. The shaft 29 is geared to the corresponding shaft 29' of unit B by the coupling shaft 30 provided with bevel gears at opposite ends thereof engaging with bevel gears 31, 31' secured on the ends of the shaft 29, 29' which extend outside the casing 1. The gears and coupling shaft 30 are enclosed in a cover 32.

Film take-off and take-up spools for the two camera units are contained in the magazines 33 and 33' respectively. The shafts on which the take-up spools are mounted are driven by an electric motor 34 through friction drives in known manner.

The path followed by the films in passing from their take-off spools to their take-up spools and through the film feed mechanism of their respective camera units is shown in Figure 3. In the case of camera unit A, the film 35 from the take-off spool is fed into the camera casing 1 from the magazine 33, passes over the idler pulleys 36 and 37 and a positively driven sprocket 38 which is coupled by a chain drive 39 to the shaft 29 to rotate at the same speed as this shaft and as the further positively driven sprocket 40 mounted thereon. The film 35 is retained in contact with the sprocket teeth of the sprockets 38 and 40 by known retaining means. From the sprocket 38 the film passes in a slack loop 41 to the upper sprocket 15 of the film feed mechanism, thence through the film gate 13 and back over the lower sprocket 15. From here the film passes in a second slack loop 42 to the sprocket 40. After passing over further idlers 43 and 44 the film passes to the take-up spool.

By reason of the sprockets 38 and 40 being driven at the same speed as the sprockets 15, the lengths of the of the slack loops 41, 42 will always remain constant. These slack loops allow the camera unit to be shifted transversely, the loops extending or closing up in a more or less helical fashion to permit this movement.

In the case of the unit B, the film path is less tortuous and idler pulleys corresponding to the idlers 36, 37, 43 and 44 are not necessary. In the case of unit B, it is only necessary to provide the two positively driven sprockets 38' and 40', the sprocket 38' being mounted on the shaft 29' of unit B and the sprocket 40' being coupled thereto by the chain drive 39'. The film extends in slack loops 41' and 42' between the film feed sprockets 15' of the unit B and the driven sprockets 38' and 40' respectively.

The objective 10 is interchangeably mounted on the housing 4 by means of a plate-like member 45 projecting rearwardly from the top of the lens mount 46 (see also Figure 4) which is adapted to be secured to a slide 47 by tightening the nut 48 to clamp the part 49 in a T-slot in the slide 47. The slide 47 is mounted on dovetail guides on the member 50 projecting from the front of the housing 4 so as to be capable of sliding movement in the axial direction of the objective for focusing purposes. Movement of the slide 47 is effected by a transversely movable pin 51 engaging in a channel-member 52 secured on the upper surface of the member 45 at an inclination to the direction of movement of the slide 47. Transverse movement of the pin 51 will cause the slide 41, and thus the objective carried thereby, to move forwards and backwards in accordance with the inclination of the channel-member 52, which inclination is determined in accordance with the focal length of the associated objective. Thus, when a different objective is fitted, the extent of axial movement of the objective for a predetermined transverse movement of the pin 51 will be determined so that each objective can be focused from close-up to infinity with the same transverse movement of the pin 51.

The pin 51 is carried from a rack 53 movable in guides 54 carried from the front of the housing 4. The rack 53 is actuated by a pinion 55 on a spindle 56 which extends downwardly from the top of the camera unit, its upper end being fitted with a skew gear 57 meshing with a second skew gear 58 carried in bearings at the top of the housing 4 with its axis extending transversely of the camera casing 1. The skew gears 58, 58' of the two camera units A and B are arranged in axial alignment and a splined shaft 59 slidably extends therethrough so that, by rotating the handle 60 on the end of the shaft 59, the focusing of both camera units A and B may be effected simultaneously.

The camera unit incorporates a reflex shutter 61 (Figure 4). The shutter rotates about an axis which is inclined at an angle of 45° to the optical axis of the objective, the surface of the shutter facing the objective being made reflecting so that, during periods of obturation, an image of the scene being photographed will be reflected up the passage 62 in the housing 4 from where it can be reflected into a viewfinder eyepiece, for example in the manner described in the specification of our copending application Serial No. 448,892, now abandoned.

As above-mentioned the film feed mechanism is assembled as a sub-unit on the plate 12 arranged at the side of the compartment 11. As shown in Figures 5 and 6, the plate 12 is supported, by nuts 63 fixed in the plate 12, on three micrometer screws 64, the screws being coupled together by gears 65, 66, 67, so as to rotate together. All the screws 64 are simultaneously rotated by the same amount when the gear wheel 65 is turned. Gear wheel 65 is turned from the shaft 68 by the gears 69, 70, 71. The shaft 68 is splined so as to be longitudinally slidable in but rotatably fixed to the gear 69 so as to permit transverse movement of the camera unit relative to the shaft 68. The shaft 68 is provided with an operating handle 72 outside the casing 1, and is mechanically coupled by gearing (not shown) to the shaft 68' of camera unit B so that the micrometer screws of both sub-units will be operated simultaneously. By rotating the handle 72, the gates and film feed mechanisms of the two units A and B will be moved transversely with respect to the optical axes of the objectives, thereby adjusting the convergence or "toeing-in" of the two optical systems.

The feed sprockets 15 and other parts of the film feed mechanism are mounted on and movable with the plate 12, being keyed by splined shafts or the like to their respective driving members which are arranged within the compartment 11.

The casing 1 may be provided with one or more removable sections or doors to permit of access to the camera units for film threading or other purposes.

Although a particular embodiment has been described, it will be understood that various modifications may be made without departing from the scope of the invention as defined by the appended claims.

We claim:

1. A stereoscopic motion picture camera comprising a box-like camera casing having an aperture in its front wall through which light from the scene to be photographed passes into the camera, a semi-reflecting mirror arranged within the casing behind said aperture and inclined approximately at 45° to the horizontal plane and with the line of intersection of the plane of the mirror and the horizontal plane extending substantially perpendicular to light passing through said aperture, two motion picture camera units each comprising an objective and an intermittent film feed mechanism, the first camera unit having its objective arranged behind said mirror and facing the aperture in the camera casing with the axis of its objective extending horizontally and perpendicular to the line of intersection of the plane of the mirror and the horizontal plane, the second camera unit being arranged with the axis of its objective extending vertically to receive light reflected from the front surface of said mirror, means for driving the film feed mechanisms of the two camera units at the same speed, means for mounting at least one camera unit including guides for permitting guided movement of said at least one camera unit within the camera casing in a horizontal direction parallel to the plane of the mirror, film supply and takeup spools for films associated with said camera units mounted in fixed positions on said camera casing, sprocket means mounted within said casing to withdraw film from the supply spool for the film associated with said movable camera unit and to return film to the associated take-up spool, means for driving said sprocket means at a constant speed, the lengths of film between said sprocket means and the feed mechanism of the movable camera unit comprising slack loops which permit horizontal movement of said movable camera unit within the camera casing, and light screening partitions extending between the camera units and the interior of the casing and preventing light other than the light passing through said objectives from reaching the films passing within the camera casing.

2. Camera as claimed in claim 1 wherein the film gate and film-engaging members of a film feed mechanism are assembled as a sub-unit which is mounted on a camera unit by adjustable mounting means which enable the sub-unit to be moved transversely with respect to the optical axis of the objective.

3. A stereoscopic motion picture camera comprising a box-like camera casing having an aperture in its front wall through which light from the scene to be photographed passes into the camera, a semi-reflecting mirror arranged within the casing behind said aperture and inclined approximately at 45° to the horizontal plane and with the line of intersection of the plane of the mirror and the horizontal plane extending substantially perpendicular to light passing through said aperture, two motion picture camera units each comprising an objective and an intermittent film feed mechanism, the first camera unit having its objective arranged behind said mirror and facing the aperture in the camera casing with the axis of its objective extending horizontally and perpendicular to the line of intersection of the plane of the mirror and the horizontal plane, the second camera unit being arranged with the axis of its objective extending vertically to receive light reflected from the front surface of said mirror, means for driving the film feed mechanisms of the two camera units at the same speed, means for mounting at least one camera unit including guides for permitting guided movement of said at least one camera unit within the camera casing in a horizontal direction parallel to the plane of the mirror, film supply and take-up spools for films associated with said camera units mounted in fixed positions on said camera casing, first sprocket means mounted within said casing to withdraw film from the supply spool for the film associated with said movable camera unit and to return film to the associated take-up spool, second sprocket means mounted on said movable camera unit for feeding film to and withdrawing film from the film feed mechanism of said movable camera unit, means for driving said first and second sprocket means at the same speed, the lengths of film said first and second sprocket means comprising slack loops which permit horizontal movement of said movable camera unit within the camera casing, and light screening partitions extending between the camera units and the interior of the casing and preventing light other than the light passing through said objectives from reaching the films passing within the camera casing.

4. Camera as claimed in claim 3, wherein said first and second sprocket means are arranged coaxially in axially spaced relationship, said first and second sprocket means being coupled together for rotation at the same speed by shaft means which allow relative axial movement therebetween to permit the movable camera unit to be moved along its guides.

5. Camera as claimed in claim 4, wherein each said sprocket means comprises two sprockets, the two sprockets of the first sprocket means being co-axial respectively with the two sprockets of the second sprocket means, the pairs of co-axial sprockets being coupled by separate shafts and each pair being coupled to the other pair so that all sprockets rotate at the same speed.

6. A stereoscopic motion picture camera comprising a box-like camera casing having an aperture in its front wall through which light from the scene to be photographed passes into the camera, a semi-reflecting mirror arranged within the casing behind said aperture and inclined approximately at 45° to the horizontal plane and with the line of intersection of the plane of the mirror and the horizontal plane extending substantially perpendicular to light passing through said aperture, two motion picture camera units each comprising an objective, a film gate and an intermittent film feed mechanism, the first camera unit having its objective arranged behind said mirror and facing the aperture in the camera casing and with the axis of its objective extending horizontally and perpendicular to the line of intersection of the plane of the mirror and the horizontal plane, the second camera unit being arranged with the axis of its objective extending vertically to receive light reflected from the front surface of said mirror, means for driving the film feed mechanisms of the two camera units at the same speed, means for mounting said first camera unit including guides for permitting guided movement of said first camera unit within the camera casing in a horizontal direction parallel to the plane of the mirror, means for mounting said second camera unit including guides for permitting guided movement of said second camera unit within the camera casing in a horizontal direction parallel to the plane of the mirror, first and second film supply spools and first and second film take-up spools for films associated with said first and second camera units respectively, said spools being mounted in fixed positions on said camera casing, first sprocket means mounted within said casing to withdraw film from said first supply spool and to return film to said first take-up spool, second sprocket means mounted on said first camera unit for feeding film to and withdrawing film from the film feed mechanism of said first camera unit, third sprocket means mounted in said casing, to withdraw film from said second supply spool and to return film to said second take-up spool, fourth sprocket means mounted on said second camera unit for feeding film to and withdrawing film from the film feed mechanism of said second camera unit, means for driving said four sprocket means all at the same speed, the lengths of films between said first and second sprocket means and said third and fourth sprocket means comprising slack loops which permit horizontal movement of said camera units within the camera casing, and light screening partitions extending between the camera units and the interior of the casing and preventing light other than the light passing through said objectives from reaching the films passing within the camera casing.

7. Camera as claimed in claim 6, wherein said first and second sprocket means are arranged coaxially, and said third and fourth sprocket means are also arranged coaxially, the pairs of coaxial sprocket means being coupled by shaft means which rotatably couple the sprocket means together whilst permitting axial movement therebetween.

8. Camera as claimed in claim 7, wherein the film gate, intermittent film feed mechanism and sprocket means of a camera unit are assembled as a sub-unit which is mounted on the part of the camera unit, which carries the objective and is supported on the guides, by adjustable means which enable the sub-unit to be moved relative to the optical axis of the objective in a direction transverse to the direction of film feed, and a common actuating member for simultaneously operating the said adjustable means of the two camera units.

References Cited in the file of this patent

UNITED STATES PATENTS

| | | |
|---|---|---|
| 1,321,629 | Harrington | Nov. 11, 1919 |
| 1,494,306 | Harrington | May 13, 1924 |
| 1,892,683 | Robertson | Jan. 3, 1933 |
| 2,108,201 | Jones | Feb. 15, 1938 |
| 2,153,892 | Jackman | Apr. 11, 1939 |
| 2,268,712 | Luer et al. | Jan. 6, 1942 |
| 2,460,320 | Waldeyer | Feb. 1, 1949 |
| 2,583,030 | Waller et al. | Jan. 22, 1952 |
| 2,630,737 | Ramsdell | Mar. 10, 1953 |